Figure 1:
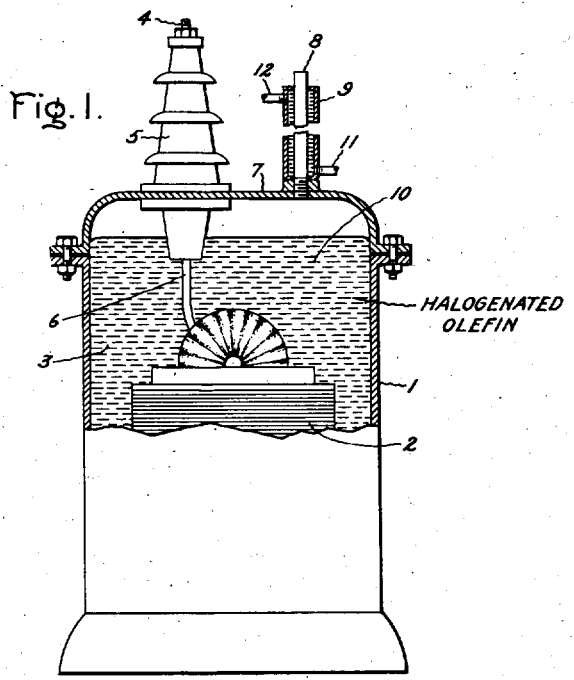

Oct. 29, 1935.  F. M. CLARK  2,019,338

DIELECTRIC COMPOSITION

Filed Jan. 16, 1934

Inventor:
Frank M. Clark,
by Harry E. Dunham
His Attorney.

Patented Oct. 29, 1935

2,019,338

UNITED STATES PATENT OFFICE 2,019,338

DIELECTRIC COMPOSITION

Frank M. Clark, Pittsfield, Mass., assignor to General Electric Company, a corporation of New York Application January 16, 1934, Serial No. 706,852

8 Claims. (Cl. 252—1)

The present invention relates to halogenated organic compositions comprising wholly or in part unsaturated compounds of the olefin type, such compositions being suitable for use as dielectric materials in electrical devices, such as transformers, capacitors, switches, and the like.

As described in my prior United States Patents 1,931,373 and 1,931,455, both issued October 17, 1933, it is advantageous to employ in electrical devices a dielectric material comprising one or more liquid halogenated hydrocarbons containing a sufficiently high proportion of halogen to insure non-inflammability of such gases as might be evolved by decomposition of a dielectric by an arc or otherwise. Heretofore only halogenated aromatic hydrocarbons have proved to be sufficiently stable for this purpose.

I have discovered that the chemical instability heretofore experienced with dielectric materials comprising aliphatic halogenated compounds is associated with the chemical saturation of the carbon atom to which the halogen is chemically attached, or, in other words, that chemically saturated carbon atoms possess an electronic condition which results in increased reactivity of the combined halogen under the conditions existing in an electrical device. I have also discovered that, if the halogen atoms instead of being attached to a chemically saturated carbon are attached to chemically unsaturated carbons, then in such case the halogenated compound is stable as a dielectric material under the normal operating conditions of electrical devices.

I have found that the chemical stability resulting when the halogen atom is attached to a chemically unsaturated carbon appears to be closely related to the electronic condition of the carbon atom of halogenated benzene compounds characterized by similar chemical stability.

Aliphatic compounds which I have found to possess unlooked-for chemical stability are the halogenated derivatives of the olefins, such, for example, as the chlorinated ethylenes or propylenes containing the chlorine atom or atoms attached to the unsaturated carbon or carbons, and also cyclic or aromatic derivatives of such compounds with or without halogen substituted in the aromatic nucleus in addition to the halogen on the olefinic carbons. The introduction of the aromatic group does not affect the chemical stability of the chlorine atoms chemically united to the unsaturated carbons. Chlorinated styrolene and chlorinated divinyl benzene containing the chlorine atoms either attached to the unsaturated carbons of the aromatic group or the olefin group are further illustrations of chemically stable halogenated olefin derivatives. If a material is desired which not only is non-inflammable in itself but which under decomposition for any reason shall evolve only non-inflammable gases, it is necessary to introduce sufficient halogen into the molecule that it contains an amount of halogen at least chemically equivalent to the amount of hydrogen present.

Dielectric compositions included in the present invention also comprise mixtures of one or more halogenated olefins and one or more halogenated aromatic hydrocarbons, such, for example, as mixtures of a chlorinated olefin and chlorinated diphenyl or chlorinated benzene, or both.

Figure 2:
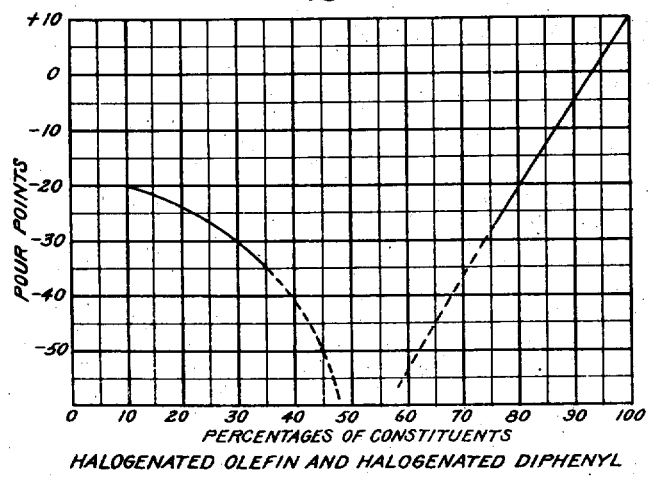

The accompanying drawing shows in Fig. 1 in side elevation and partly in section a transformer containing a halogenated olefin dielectric composition and Fig. 2 is a graph showing the depression of point or congealing temperature resulting when a halogenated cyclic compound is mixed with a halogenated olefin.

The term "olefin" has been used herein to describe the compounds of a class which I have found to possess chemical stability, including both (1) the aliphatic compounds having the general formula $C_nH_{2n}$ containing unsaturated carbons and (2) substituted aliphatic compounds having the general formula $C_nH_{2n-a}Ar_a$ containing unsaturated carbons in the molecule in which an aromatic group, (Ar) (or groups, $Ar_a$) have been substituted for hydrogen. The aromatic group may be a phenyl group, or a condensed group, such as the naphthalene group, or a polyphenyl group such as the diphenyl group. The term "halogenated olefin" is to be understood as limited to those compounds in which the halogen atom is attached to an unsaturated carbon either of the olefin group itself or of an aromatic nucleus.

The liquid halogenated olefins possess also a viscosity which easily adapts these materials to dielectric purposes, especially in apparatus such as transformers, where low viscosity is demanded for thermal reasons. Trichlor- or tetrachlor-ethylene are examples of halogenated liquid olefins suitable for dielectric use. These materials are inert and without corrosive action to metals present in electrical devices. These materials have a viscosity of about 30 seconds Saybolt universal and show little change in viscosity over a range of temperatures. The electrical characteristics of these materials are good. The dielectric strength, tested in a .1" disc electrode gap, gives a value higher than 30 kilovolts. The dielectric constant of approximately 3.3 and the power factor of less than 1% at 1000 cycles, 25° C., coupled with a characteristic resistivity of about $1 \times 10^{12}$ ohms per centimeter cube at 500 volts D. C., makes these materials particularly well-adapted for general dielectric application in transformers, circuit breakers, capacitors, cables, and the like.

The transformer shown in Fig. 1 constitutes one example of an electrical device in which a liquid dielectric embodying my invention may be used with advantageous results. As well known, a transformer comprises a tank 1 containing a magnetic core 2 and electrical windings 3. For the sake of simplicity only a single terminal 4, provided with an insulator 5 has been shown, this terminal being connected to one of the windings by a conductor 6. Mounted on the cover 7, together with the terminal is condenser 8, provided with a jacket 9 through which a cooling fluid may be circulated to condense vapors evolved from the body of dielectric material 10. Inlet and outlet ducts 11, 12 are provided for the cooling fluid which conveniently may consist of water. To render the drawing simple and to indicate that its height may be varied the condenser has been shown as broken. It is to be understood that the condenser has been indicated conventionally as representative of any one of various types of condensers either air-cooled or liquid-cooled.

Halogenated olefins have a relatively low boiling point or in other words a high volatility. For example, dichlor ethylene, $C_2H_2Cl_2$, is a liquid which boils at about 55° C., trichlor ethylene, $C_2HCl_3$, is a liquid which boils at about 87 to 88° C., alpha trichlor propylene, $C_3H_3Cl_3$, is a liquid which boils at about 115° C., and tetrachlor ethylene is a liquid which boils at about 120° C. Vapors evolved from such compounds during the operation of a transformer or other electric device are condensed to the liquid state in the condenser 8 and returned to the main body of the cooling medium.

The necessity of using a condenser may be eliminated by the use of a substituted halogenated olefin, the molecule of which contains an aromatic nucleus. Thus although synthetic dichlor ethylene boils at 55° C., the introduction of the benzene nucleus results in dichlor styrolene, or styrene, ($C_6H_5.CCl:CHCl$) a product which boils at 221° C. For many electrical purposes the use of a halogenated olefin containing a substituted aromatic nucleus therefore will be more advantageous.

Many of the halogenated olefins possess a relatively high congealing point which tends to restrict their use for dielectric purposes. As already indicated, a lower congealing temperature (pour point) may be secured by compounding the halogenated olefin with a halogenated aromatic compound of the type represented by a halogenated benzene, a halogenated polyphenyl, such as halogenated diphenyl, or the halogenated derivatives of diphenyl ketone, diphenyl methane, diphenyl benzene, or diphenyl oxide or with halogenated naphthalene, a halogenated compound containing condensed nuclei. For most purposes chlorine compounds are to be preferred over compounds containing bromine or other halogens.

As an illustration of the characteristics of such blended compositions, I cite the case of tetrachlor ethylene compounded or mixed with pentachlor diphenyl as an example of a chlorinated polyphenyl. In Fig. 2 is indicated the extraordinary and unexpected decrease in pour point of liquid compositions resulting in such case. The pour points or congealing temperatures are plotted here as ordinates and the percentages of halogenated diphenyl as abscissae. In the specific case here taken, the diphenyl compound is the technical pentachlor diphenyl which itself is a viscous material having a pour point of about +10° C. The pour points were determined by the standard methods adopted by the American Society for Testing Materials. As pentachlor diphenyl is present in increasing amounts in the mixture (accompanied by a corresponding decrease of tetrachlor ethylene), the pour point of the mixture drops to a value lower than −50° C. This extremely low pour point is found in a mixture made up of equal parts by weight of tetrachlor ethylene and pentachlor diphenyl. As indicated by dotted lines the exact pour point of the 50:50 mixture was not determined experimentally because of the difficulty of working at such low temperatures.

The viscosity of such a mixture is not materially different from the viscosity of the pure tetrachlor ethylene alone, being 30 seconds Saybolt universal at 37.8° C. Under the same testing conditions tetrachlor ethylene has a viscosity of 28 seconds Saybolt. Pentachlor diphenyl has a very high viscosity. At the commonly used testing temperature at 37.8° C. the viscosity of pentachlor diphenyl is 1200 seconds Saybolt universal.

Such mixed halogenated products constitute a material particularly well adapted for use in apparatus exposed to low temperature conditions. Other mixtures of chlorinated olefins and chlorinated cyclic compounds are characterized by extraordinary low congealing temperatures. The pour point of a mixture of 25% by weight or more of trichlor ethylene and 75% or less of pentachlor diphenyl is lower than −60° C. The viscosity of the 50:50 mixture is about 34 seconds Saybolt universal.

While I have illustrated my invention with particular reference to chlorine as a particular halogen in products embodying my invention, products containing other halogens are not precluded and such products are to be considered as being included in the present invention.

The term "olefin" is used herein to designate ordinary forms of such compounds as distinguished from solid resinous olefin polymerization products such as described in Clark and Kutz U. S. Patent 1,998,309 of March 16, 1935.

Halogenated olefin products in many cases can be advantageously compounded with an oil, either a hydrocarbon oil, for example, a petroleum oil; or a glyceride oil, for example, castor oil. In some industrial fields, an admixture of a halogenated product, such, for example, as trichlor, or tetrachlor ethylene, renders an oil better suited for its purposes while at the same time rendering it less inflammable. For most purposes the oil should be in a preponderant proportion by volume in the mixture. Although I have herein referred mainly to dielectric and cooling uses of compositions embodying my invention, other uses, such as use for lubrication, are not to be excluded.

What I claim as new and desire to secure by Letters Patent of the United States, is:

1. A dielectric composition containing a halogenated olefin, in which halogen is attached only to unsaturated carbon, and a halogenated aromatic hydrocarbon as substantial ingredients.

2. A dielectric composition, a substantial proportion of which consists of trichlor ethylene and chlorinated diphenyl.

3. A dielectric composition containing tetrachlor ethylene and a chlor polyphenyl as substantial ingredients.

4. A dielectric composition containing substantial amounts of tetrachlor ethylene and pentachlor diphenyl.

5. A composition of matter containing substantial proportions of a halogenated olefin compound containing an aromatic group and a substantial proportion of halogenated cyclic hydrocarbon compound.

6. A composition of matter containing a substantial proportion of halogenated styrolene and a substantial proportion of halogenated polyphenyl compound.

7. A composition of matter containing as substantial ingredients chlor olefin and chlor polyphenyl.

8. A liquid composition suitable for insulating use in electrical apparatus comprising as substantial ingredients liquid chlor ethylene and chlor polyphenyl.

FRANK M. CLARK.